(12) United States Patent
Jurion et al.

(10) Patent No.: US 7,143,350 B2
(45) Date of Patent: Nov. 28, 2006

(54) METHOD AND SYSTEM FOR CHARACTER SEQUENCE CHECKING ACCORDING TO A SELECTED LANGUAGE

(75) Inventors: Benoit J. Jurion, Seattle, WA (US); Chakrapani Appalabattula, Bellevue, WA (US); Steven Chai, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/039,195

(22) Filed: Jan. 18, 2005

(65) Prior Publication Data
US 2005/0187755 A1     Aug. 25, 2005

Related U.S. Application Data

(63) Continuation of application No. 09/345,195, filed on Jun. 30, 1999, now abandoned.

(51) Int. Cl.
G06F 15/00     (2006.01)
(52) U.S. Cl. .......................... 715/536; 715/535; 704/8; 704/9
(58) Field of Classification Search ................ 715/535, 715/536; 704/8, 9
See application file for complete search history.

(56) References Cited

U.S. PATENT DOCUMENTS

| | | | |
|---|---|---|---|
| 5,802,482 A | * | 9/1998 | Sun .............................. 704/8 |
| 5,873,111 A | | 2/1999 | Edberg .......................... 704/8 |
| 6,272,495 B1 | * | 8/2001 | Hetherington .............. 707/101 |
| 6,411,948 B1 | * | 6/2002 | Hetherington et al. ......... 707/2 |

OTHER PUBLICATIONS

Alfred, Strohmeier, et al. Ordering of Characters and Strings, Ada Letters, Sep./Oct. 1990, vol. X, No. 7, pp. 70-84.*
Akira Nakanishi, Writing Systems of the World: Alphabets, Syllabaries, Pictograms, 1980.
Thaweesak Koanantakool, Ph.D., The Keyboard Layouts and Input Method of the Thai Language, 1993.

* cited by examiner

Primary Examiner—William Bashore
Assistant Examiner—Rachna Singh
(74) Attorney, Agent, or Firm—Merchant & Gould

(57) ABSTRACT

A method and system for checking the validity of a sequence of input characters according to the syntactical rules of a selected language is provided. If an input character may not begin a valid sequence of characters, or if the input character may not be appended to a previously input sequence of characters according to the rules of the selected language, the newly input character may be prohibited from being displayed singularly or appended to the previous sequence and displayed on the user's computer. Previously input character sequences may be edited by determining the sequence validity context of previously input sequences of characters.

20 Claims, 14 Drawing Sheets

| CHARACTER | | 0 | CTRL | Space | NON1 | NON2 | LT | LV1 | LV2 | LV3 | LV4 | CONS | TONE | AD1 | AD2 |
|---|---|---|---|---|---|---|---|---|---|---|---|---|---|---|---|
| CONTEXT | STATE | | | | | | | | | | | | | | |
| initial | 0 | 0 | 1a | 3a | 2a | *4a | 5a | 8A | 20a | 23a | 27a | 32a | | | |
| CTRL | 1 | 0 | | | | | | | | | | | | | |
| NON1 | 2 | 0 | | | | | | | | | | | | | |
| Space | 3 | 0 | | | | *4a | | | | | | | | | |
| N2 | 4 | 0 | | | | | | | | | | | | | |
| LT | 5 | 0 | | | | | | | | | | | | | |
| LTFV4 | 6 | 0 | | | | | | | | | | | | | |
| LTFV2 | 7 | 0 | | | | | | | | | | | | | |
| LV1 | 8 | | | | | | | 40aCa23 | 20r | 23r | 27r | 9a | | | |
| LV1C | 9 | 0 | | | | | | | | | | | 19a | 37d2a | 36a |
| LV1CAV1 | 10 | 0 | | | | | | | | | | | 11a | *48d3a | 36r |
| LV1CAV1T | 11 | 0 | | | | | | | | | | | 11r | *46d4r | 36dr |
| LV1CAV3 | 12 | 0 | | | | | | | | | | | 13a | 37d3r | 36r |
| LV1CAV3T | 13 | 0 | | | | | | | | | | | 13r | 37d4dr | 36dr |
| LV1CFV1 | 14 | 0 | | | | | | | | | | | 19r | 37d3r | 36r |
| LV1CTFV4 | 15 | 0 | | | | | | | | | | | 15r2 | 37d4dr | 36dr |
| LV1CFV4FV1 | 16 | 0 | | | | | | | | | | | 17i2 | 37dd3r | 36dr |
| LV1CTFV4FV1 | 17 | 0 | | | | | | | | | | | 17r3 | 37d5ddr | 36ddr |
| LV1CFV4 | 18 | 0 | | | | | | | | | | | 15i1 | 37d3r | 36r |
| LV1CT | 19 | 0 | | | | | | | | | | | 18r | 37d3r | 36r |
| LV2 | 20 | | | | | | | | 8r | 20r | 23r | 27r | 21a | | |
| LV2C | 21 | 0 | | | | | | | | | | | 22a | 37d2a | 38d2a |
| LV2CT | 22 | 0 | | | | | | | | | | | 22r | 37d3r | 38d3r |
| LV3 | 23 | | | | | | | | 8r | 20r | | 27r | 24a | | |
| LV3C | 24 | 0 | | | | | | | | | | | 66a | 37d2a | 25a |
| LV3CAD2 | 25 | 0 | | | | | | | | | | | 66r | 37d3r | |
| LV3CFV1 | 26 | 0 | | | | | | | | | | | *69j | 37d3r | 25r |
| LV4 | 27 | | | | | | | | 8r | 20r | 23r | | 28a | | |
| LV4C | 28 | 0 | | | | | | | | | | | 29a | 37d2a | 38d2a |
| LV4CT | 29 | 0 | | | | | | | | | | | 29r | 37d3r | 38d3r |
| LV4CTFV1 | 30 | 0 | | | | | | | | | | | 30r2 | 37d4dr | 38d4dr |
| LV4CFV1 | 31 | 0 | | | | | | | | | | | 30i1 | 37d3r | 38d3r |
| C | 32 | 0 | | | | | | | | | | | 60a | 37a | 38a |
| CFV1 | 33 | 0 | | | | | | | | | | | 61i1 | 37r | 38r |
| CFV3 | 34 | 0 | | | | | | | | | | | 62i1 | 37r | 38r |
| CFV4 | 35 | 0 | | | | | | | | | | | 63i1 | 37r | 38r |
| LV1CAD2 | 36 | 0 | | | | | | | | | | | *19r | 37d3r | |
| CAD1 | 37 | 0 | | | | | | | | | | | 60r | | 38r |
| CAD2 | 38 | 0 | | | | | | | | | | | 60r | 37r | |
| CAD3 | 39 | 0 | | | | | | | | | | | 60r | 37r | 38r |
| LV1LV1 | 40 | | | | | | | | | 20dr | 23dr | 27dr | 41a | | |
| LV1LV1C | 41 | 0 | | | | | | | | | | | 67a | 37d3d2a | 47a |
| CAD3FV4 | 42 | 0 | | | | | | | | | | | 62r2FV3r | 37r | 38r |
| CAD4 | 43 | 0 | | | | | | | | | | | 60r | 37r | 38r |
| CAV1 | 44 | 0 | | | | | | | | | | | 45a | 46a | 38r |
| CAV1T | 45 | 0 | | | | | | | | | | | 45r | 46r | 38dr |
| CAV1AD1 | 46 | 0 | | | | | | | | | | | 45r | | 38dr |
| LV1LV1CAD2 | 47 | 0 | | | | | | | | | | | 67r | 37d4d3r | |
| LV1LV1CFV1 | 48 | 0 | | | | | | | | | | | *59j | 37d4d3r | 47r |
| CAV2 | 49 | 0 | | | | | | | | | | | 50a | 37r | 38r |
| CAV2T | 50 | 0 | | | | | | | | | | | 50r | 37dr | 38dr |
| CAV3 | 51 | 0 | | | | | | | | | | | 52a | 37r | 38r |
| CAV3T | 52 | 0 | | | | | | | | | | | 52r | 37dr | 38dr |
| CAV4 | 53 | 0 | | | | | | | | | | | 54a | 37r | 38r |
| CAV4T | 54 | 0 | | | | | | | | | | | 54r | 37dr | 38dr |
| CBD | 55 | 0 | | | | | | | | | | | 60r | 37r | 38r |
| CBV1 | 56 | 0 | | | | | | | | | | | 57a | 58a | 38r |
| CBV1T | 57 | 0 | | | | | | | | | | | 57r | 58r | 38dr |
| CBV1AD1 | 58 | 0 | | | | | | | | | | | 57r | | 38dr |
| LV1LV1CTFV1 | 59 | 0 | | | | | | | | | | | 59r2 | 37d5d4dr | 47dr |
| CT | 60 | 0 | | | | | | | | | | | 60r | 37r | 38r |
| CTFV1 | 61 | 0 | | | | | | | | | | | 61r2 | 37dr | 38dr |
| CTFV3 | 62 | 0 | | | | | | | | | | | 62r2 | 37dr | 38dr |
| CTFV4 | 63 | 0 | | | | | | | | | | | 63r2 | 37dr | 38dr |
| CBV2 | 64 | 0 | | | | | | | | | | | 65a | 37r | 38r |
| CBV2T | 65 | 0 | | | | | | | | | | | 65r | 37dr | 38dr |
| LV3CT | 66 | 0 | | | | | | | | | | | 66r | 37d3r | 25r |
| LV1LV1CT | 67 | 0 | | | | | | | | | | | 67r | 37d4d3r | 47r |
| LV1CTFV1 | 68 | 0 | | | | | | | | | | | 68r2 | 37d4dr | 36dr |
| LV3CTFV1 | 69 | 0 | | | | | | | | | | | 69r2 | 37d4dr | 25dr |
| CFV4FV1 | 70 | 0 | | | | | | | | | | | 63di1 | 37dr | 38dr |

FIG. 4-1

| AD3 | AD4 | AV1 | AV2 | AV3 | AV4 | BV1 | BV2 | BD | FV1 | FV2 | FV3 |
|---|---|---|---|---|---|---|---|---|---|---|---|
| | | | | | | | | | | 7a | |
| | | | | | | | | | | 7r | |
| 39d2a | 43d2a | 10a | 49d2a | 12a | 53d2a | 56d2a | 64d2a | 55d2a | 14a | | 34d2a |
| 39d3r | 43d3r | | 49d3r | 12r | 53d3r | 56d3r | 64d3r | 55d3r | 14r | | 34d3r |
| 39d4dr | 43d4dr | | 50d4r2 | 13r2 | 54d4r2 | 57d4r2 | 65d4r2 | 55d4dr | *68d2a | | 62d4d2a |
| 39d3r | 43d3r | 10r | 49d3r | 12r | 53d3r | 56d3r | 64d3r | 55d3r | 14r | | 34d3r |
| 39d4dr | 43d4dr | 11r2 | 50d4r2 | 13r2 | 54d4r2 | 57d4r2 | 65d4r2 | 55d4dr | *68d2a | | 62d4d2a |
| 39d3r | 43d3r | 10r | 49d3r | 12r | 53d3r | 56d3r | 64d3r | 55d3r | | | 34d3r |
| 39d4dr | 43d4dr | 11i2d | 50d4i2d | 13i2d | 54d4i2d | 57d4i2d | 65d4i2d | 55d4dr | 17a | | 62d4r |
| 34dd3FV3r | 43d4dr | 10dr | 49dd3r | 12dr | 53dd3r | 56dd3r | 64dd3r | 55dd3r | | | 34dd3r |
| 39dd4dr | 43dd4dr | 11di2d | 50dd4i2d | 13di2d | 54dd4i2d | 57dd4i2d | 65dd4i2d | 55dd4dr | | | 62dd4r |
| 34d3FV3r | 43d3r | 10r | 49d3r | 12r | 53d3r | 56d3r | 64d3r | 55d3r | 16a | | 34d3r |
| 39d3r | 43d3r | 11i1 | *45d3i | 13i1 | 54d3i | 57d3i1 | 65d3i1 | 55d3r | 68a | | 62d3a |
| *39d2a | 43d2a | 44d2a | 49d2a | 51d2a | 53d2a | 56d2a | 64d2a | 55d2a | 33d2a | | 34d2a |
| 39d3r | 43d3r | *45d3i | *50d3i | *52d3i | *54d3i | *57d3i | *65d3i | 55d3r | 33d3r | | *62d3a |
| 39d2a | 43d2a | 44d2a | 49d2a | 51d2a | 53d2a | 56d2a | 64d2a | 55d2a | 26a | | 34d2a |
| 39d3r | 43d3r | 44d3r | 49d3r | 51d3r | 53d3r | 56d3r | 64d3r | 55d3r | 26r | | 34d3r |
| 39d3r | 43d3r | 44d3r | 49d3r | 51d3r | 53d3r | 56d3r | 64d3r | 55d3r | | | 34d3r |
| 39d2a | 43d2a | 44d2a | 49d2a | 51d2a | 53d2a | 56d2a | 64d2a | 55d2a | 31a | | 34d2a |
| 39d3r | 43d3r | 45d3i1 | *50d3i1 | 52d3i1 | 54d3i1 | *57d3i1 | *65d3i1 | 55d3r | 30a | | 62d3a |
| 39d4dr | 43d4dr | 45d4i2d | 50d4i2d | 52d4i2d | *54d4i2d | 57d4i2d | 65d4i2d | 55d4dr | | | 62d4r |
| 39d3r | 43d3r | 44d3r | 49d3r | 51d3r | 53d3r | 56d3r | 54d3r | 55d3r | | | 34d3r |
| 39a | 43a | 44a | 49a | 51a | 53a | 56a | 64a | 55a | 33a | | 34a |
| 39r | 43r | 44r | 49r | 51r | 53r | 56r | 64r | 55r | | | 34r |
| 39r | 43r | 44r | 49r | 51r | 53r | 56r | 64r | 55r | 33r | | |
| 34FV3r | 43r | 44r | 49r | 51r | *53r | 56r | 64r | 55r | 70a | | 34r |
| 39d3r | 43d3r | 10r | 49d3r | 12r | 53d3r | 56d3r | 64d3r | 55d3r | 14r | | 34d3r |
| 39r | 43r | 46i1 | 49r | 51r | 53r | 58i1 | 64r | 55r | 33r | | 34r |
| 39r | 43r | 44r | 49r | 51r | 53r | 56r | 64r | 55r | 33r | | 34r |
| | 43r | 44r | 49r | 51r | 53r | *56r | 64r | 55r | 33r | | 34r |
| 39d3d2a | 43d3d2a | 44d3d2a | 49d3d2a | 51d3d2a | 53d3d2a | 56d3d2a | 64d3d2a | 55d3d2a | 48a | | 34d3d2a |
| 39dr | 43dr | 44dr | 49dr | 51dr | 53dr | 56dr | 64dr | 55dr | 33dr | | 34dr |
| 39r | * | 44r | 49r | 51r | 53r | 56r | 64r | 55r | 33r | | 34r |
| 39r | 43r | | 49r | 51r | 53r | 56r | 64r | 55r | 33r | | 34r |
| 39dr | 43dr | | 50r2 | 52r2 | 54r2 | 57r2 | 65r2 | 55dr | 61d2a | | 62d2a |
| 39dr | | 49dr | | 51dr | 53dr | 56dr | 64dr | 55dr | 33dr | | 34dr |
| 39d4d3r | 43d4d3r | 44d4d3r | 49d4d3r | 51d4d3r | 53d4d3r | 56d4d3r | 64d4d3r | 55d4d3r | 48r | | 34d4d3r |
| 39d4d3r | 43d4d3r | 44d4d3r | 49d4d3r | 51d4d3r | 53d4d3r | 56d4d3r | 64d4d3r | 55d4d3r | | | 34d4d3r |
| 39r | 43r | 44r | | 51r | 53r | 56r | 64r | 55r | 33r | | 34r |
| 39dr | 43dr | 45r2 | | 52r2 | 54r2 | 57r2 | 65r2 | 55dr | 61d2a | | 62d2a |
| 39r | 43r | 44r | 49r | 51r | 53r | 56r | 64r | 55r | 33r | | 34r |
| 39dr | 43dr | 45r2 | 50r2 | 52r2 | 54r2 | 57r2 | 65r2 | 55dr | 61d2a | | 62d2a |
| 39r | 43r | 44r | 49r | 51r | * | 56r | 64r | 55r | 33r | | 34r |
| 39dr | 43r | 45r2 | 50r2 | 52r2 | | 57r2 | 65r2 | 55dr | | | 62d2a |
| 39r | 43r | 44r | 49r | 51r | 53r | 58r | 64r | | * | | 34r |
| 39r | 43r | 44r | 49r | 51r | 53r | | 64r | 55r | 33r | | 34r |
| 39dr | 43dr | 45r2 | 50r2 | 52r2 | 54r2 | * | 65r2 | 55dr | 61d2a | | 62d2a |
| 39dr | 43dr | 46r2 | 49d2r | 51dr | 53dr | * | 64dr | 55dr | 33dr | | 34dr |
| 39d5d4dr | 43d5d4dr | *45d5d4di | *50d5d4di | *52d5d4di | *54d5d4di | *57d5d4di | *65d5d4di | 55d5d4dr | | | *62d5d4r |
| 39r | 43r | 45i1 | 50i1 | 52i1 | 54i1 | 57i1 | 65i1 | 55r | 61a | | 62a |
| 39dr | 43dr | 45i2d | *50i2d | *50i2d | *54i2d | 57i2d | 65i2d | 55dr | | | 62r |
| 39dr | 43dr | 45i2d | *50i2d | 52i2d | *54i2d | 57i2d | 65i2d | 55dr | 61r | | |
| 62FV3r | 43dr | 45i2d | 50i2d | 52i2d | 54i2d | 57i2d | 65i2d | 55dr | 61r | | 62r |
| 39r | 43r | 44r | 49r | 51r | 53r | 56r | | 55r | 33r | | 34r |
| 39dr | 43dr | 45r2 | 50r2 | 52r2 | 54r2 | 57r2 | | 55dr | 61d2a | | 62d2a |
| 39d3r | 43d3r | *45d3i | *50d3i | *53d3i | *54d3i | *57d3i | *65d3i | 55d3r | 69a | | *62d3a |
| 39d4d3r | 43d4d3r | *45d4d3i | *50d4d3 | *53d4d3i | *54d4d3i | *57d4d3i | *65d4d3 | 55d4d3r | 59a | | *62d4d3a |
| 39dd3r | 43dd3r | 11di1 | *50dd3i | 13di1 | 54dd3i1 | *57dd3i1 | 65dd3i1 | 55dd3r | | | 62dd3a |
| 39d4dr | 43d4dr | *45d4di | *50d4di | *52d4di | *54d4di | *57d4di | 65d4di1 | 55d4dr | | | *62d4r |
| 34dFV3r | *43dr | 44dr | 49dr | 51dr | 53dr | 56dr | 64dr | 55dr | | | 34dr |

FIG. 4-2

| CHARACTER | | ind_chars ic | abbr Ab | delimit D | number Nb | Ind_vowel iv | norm_conso Nc | ext_conso Ec | virama V | anukta Na | dep_vowel Dv | vowel_sign Vs | accent Ac | zerowidth chars Zw |
|---|---|---|---|---|---|---|---|---|---|---|---|---|---|---|
| CONTEXT | STATE | {} | | | | | | | | | | | | |
| initial | 0 | 0 | 1a | 2a | 3a | 4a | 5a | 9a | 10a | | | | | |
| ic | 1 | 0 | | | | | | | | | | | | |
| Ab | 2 | 0 | | | | | | | | | | | | |
| D | 3 | 0 | | | | | | | | | | | | |
| Nb | 4 | 0 | | | | | | | | | | | | |
| iv | 5 | 0 | | | | | | | | | | 7a | 6a | |
| ivAc | 6 | 0 | | | | | | | | | | 8i1 7r1 8r2 | 6r1 8a 8r1 | |
| ivVs | 7 | 0 | | | | | | | | | | | | |
| ivVsAc | 8 | 0 | | | | | | | | | | | | |
| Nc | 9 | 10 | | | | | | | | 11a | 10a | | | |
| NcNa | 10 | 0 | | | | | | | | | | 14a | 18a | 20a |
| NcNaV | 11 | 12 | | | | | | | | | | | | |
| NcNaVZc | 12 | * | | | | | | | 13a | | 10a | | | 12a |
| NcNaVZNc | 13 | 10 | | | | | | | | | | | | |
| NcNaDv | 14 | 0 | | | | | | | | | | 14r1 | 16a | 15a |
| NcNaDvAc | 15 | 0 | | | | | | | | | | 15r2 15l1 | 17i1 | 15r1 |
| NcNaDvVs | 16 | 0 | | | | | | | | | | 16r2 | 16r1 | 17a |
| NcNaDvVsAc | 17 | 0 | | | | | | | | | | 17r3 17i2 | 17r2 17i1 | 17r1 |
| NcNaVs | 18 | 0 | | | | | | | | | | 16i1 | 18r1 | 19a |
| NcNaVsAc | 19 | 0 | | | | | | | | | | | 19r2 19i1 | 19r1 |
| NcNaAc | 20 | 0 | | | | | | | | | | | | 20r1 |

FIG. 5

| CHARACTER | | {} | VOWEL | TONE | CONS |
|---|---|---|---|---|---|
| CONTEXT | STATE | | V | T | C |
| initial | 0 | 0 | 1a | | 2a |
| V | 1 | 0 | | 3a | |
| C | 2 | 0 | | | |
| VT | 3 | 0 | | 3r | |

| SYMBOL | INDEX | ACTION | EXAMPLE |
|---|---|---|---|
| Char a | IP | Append the character char | AB → Ca → ABC |
| Char I [n] | IP-n where n>0 | Insert the character Char at the index location (before the ith character from the right) | ABD → Ci] → ABCD |
| d [1] | IP-1 | Remove the previous character | AB → d → A |
| dn | IP-n where n>1 | Remove the character at the index location | ABC → d2 → AC |
| Char r[1] | IP-1 | Replace the previous character with Char | AC → Br → AB |
| Char rn | IP-n where n>1 | Replace the character Char at the index location with the new character | ADC → Br2 → ABC |
| Cxy | | Contextual information (this does not necessarily generate an action) for a possible character composition by the client application. In the Thai transition table "x" has the following values: "a" for composing the last 2 characters into LV3 (Sara-AE) or "b" for composing the last 2 characters into FV3 (Sara-Am). "y" indicates the number of the next transition state. | ABC → Cx2 → AD (if x composes B and C into D) |

FIG. 9

| SYMBOL | ACTION | EXAMPLE |
|---|---|---|
| FV3r | Substitute the last character with FV3 | → FV3r → |

FIG. 9A

| KEYBOARD INPUT | OUTPUT |
|---|---|
| क | क |
| ् | क् |
| क | क्क |
| ी | क्की |

FIG. 10

| KEYBOARD INPUT | OUTPUT |
|---|---|
| क | क |
| ् | क् |
| ी | क् |

FIG. 11

| KEYBOARD INPUT | OUTPUT |
|---|---|
| क | क |
| ् | क् |
| य | क्य |
| ि | क्यि |
| ं | क्यिं |
| ो | क्यों |

FIG. 12

METHOD AND SYSTEM FOR CHARACTER SEQUENCE CHECKING ACCORDING TO A SELECTED LANGUAGE

CROSS REFERENCE TO RELATED APPLICATION

This application is a continuation of application Ser. No. 09/345,195 filed Jun. 30, 1999 now abandoned.

RELATED APPLICATIONS

This application is related to the following application, which is filed on the same day as the present application and is assigned to the same assignee as the present application: "Method And System For Automatic Type And Replace Of Characters In A Sequence Of Characters"-U.S. Pat. No. 6,631,501.

TECHNICAL FIELD

This invention relates to validation of and correction of sequences of input characters according to the syntactical rules of a selected language. More particularly, this invention relates to determining whether a typed sequence of characters is a valid sequence according to the character sequence and syntactical rules of the selected language.

BACKGROUND OF THE INVENTION

In recent years, use of computers has increased dramatically worldwide. Users of computers utilize computer programs for a variety of purposes including word processing, database management, desktop publishing, and the like. Computer users are accustomed to using "checking" program modules (e.g., spell checkers and grammar checkers) that alert the user to words or sequences of characters found in the document that are questionable based on some predefined set of rules.

The written form of some languages includes sequences of complex characters and/or symbols. For example, Asian languages like Thai, Vietnamese, and Hindi use combinations of various characters (also called simple characters herein) such as vowels, consonants, diacritics, tone marks, and accents to form complex characters. Those languages follow stringent syntactical rules that dictate which simple character is allowed next to or above or below another simple character in the composition of more complex characters used in the formation of words. In this context, a word can be composed of (a) one or more simple characters (e.g., consonant); (b) one or more complex characters (e.g., a complex character being formed by more than one simple character like a consonant and a tone mark); and (c) a combination of simple and complex characters. That is, the correct position of these simple characters in a complex character is necessary both syntactically and orthographically based on syntactical rules for each language. For example, in the Thai language, a leading Thai vowel must be followed by a consonant or a trailing vowel (also called following vowels) to form a valid Thai character. If other than a consonant or trailing vowel is input after the input of a leading vowel, then the sequence of the leading vowel and the subsequent non-consonant or non-trailing vowel character is an incorrect sequence and does not form a correct Thai language complex character or word. Similar character sequence and syntactical rules apply for other languages mentioned above, such as Vietnamese and Hindi. A problem arises for the person typing one of those languages because if the sequence of characters that should form a complex character is invalid, the complex character will not be rendered on the screen correctly, and therefore, the complex character will be meaningless.

Techniques to verify the validity of a sequence of input characters have been implemented, but those techniques are mainly oriented towards getting a proper display of the complex character and do not address the issue of enforcing a correct input sequence of characters according to the syntactical rules defined by the selected language. In some prior art systems, the validity of the sequence of characters is determined by comparing the typed sequence with a known valid displayable sequence (i.e., a sequence of characters that are valid in accordance with the rules of a selected language). Some prior art techniques allow the display of sequences of characters that are orthographically incorrect or simply display a symbol, such as a black box, whenever the sequence was not displayable due to errors in the sequence of input characters. Also, prior art sequence checking techniques do not allow for determining accurately the sequence context of a previously input sequence of characters once the user moves the cursor to a new location in the text.

Accordingly, there is a need in the art for an efficient method and system for checking the validity of a sequence of input characters according to the syntactical rules of a selected language. There is further a need for a method and system for determining the sequence validity context of a sequence of previously typed simple characters.

SUMMARY OF THE INVENTION

The present invention satisfies the above-described needs by providing a method and system for checking the validity of a sequence of input characters according to the syntactical rules of a selected language. Each simple character is checked to determine whether that simple character may form a valid sequence of simple characters according to the syntactical rules for the selected language to which the simple characters belong. If an input character may not be appended to the previously input sequence according to the rules of the selected language, the newly input character may be prohibited from being appended to the sequence and displayed on the user's computer. The present invention provides for editing of previously input character sequences by determining the validity of the context of sequences of characters.

Generally described, when a user types simple characters in the formation of complex characters in selected languages, such as Thai, Hindi and Vietnamese, a determination is made as to whether each newly typed simple character may be appended to the sequence of characters already typed by the user. If appending the new character to the sequence violates the syntactical rules of the selected language, the new character is prohibited from being appended to the sequence or from being displayed. If the user moves the cursor from one location to another in a document, a reconstruction of the sequence context is accomplished so that a determination can be made as to the validity of the next input character or any newly typed character.

More particularly described, one aspect of the present invention provides a method of checking a sequence of input characters according to rules of a selected language. The method includes the steps of receiving a first character, and determining whether the first character may begin a valid sequence of characters according to rules associated with the selected language. If the first character may begin a valid sequence of characters according to rules associated with the selected language, accepting the first character for display. If the first character may not begin a valid sequence of characters according to rules associated with the selected language, prohibiting accepting the first character for display.

If a second character is received, a determination is made as to whether the second character may be appended to the first character according to rules associated with the selected language. If the second character may be appended to the first character according to the rules associated with the selected language, then the second character is appended to the first character. If the second character may not be appended to the first character according to the rules associated with the selected language, then addition of the second character to the first character is prohibited.

The step of determining whether the second character may be appended to the first character according to rules associated with the selected language includes utilizing a state transition table and assigning a first state to the first character according to the rules associated with the selected language. A second state is assigned to the second character according to the rules associated with the selected language. A determination is made as to whether the state transition table includes a state transition from the first state to the second state. If the state transition table includes a state transition from the first state to the second state, determining the second character may be appended to the first character according to the rules associated with the selected language. If the state transition table does not include a state transition from the first state to the second state, determining the second character may not be appended to the first character according to the rules associated with the selected language.

If appending the second character to the first character creates a complete sequence of characters according to the rules associated with the selected language, determining whether a third input character may begin a second valid sequence of characters according to rules associated with the selected language. If the third character may begin a second valid sequence of characters according to rules associated with the selected language, accepting the third character for display. If the third character may not begin a second valid sequence of characters according to rules associated with the selected language, prohibiting accepting the third character for display.

In another aspect of the present invention, a system is provided for checking a sequence of input characters according to rules of a selected language. The system includes a computer program module operative to receive a first character and to determine whether the first character may be the first character of a sequence of characters according to the rules associated with the selected language. The program module is also operative to receive a second character, to determine whether the second character may be appended sequentially to the first character according to rules associated with the selected language, and to append the second character sequentially to the first character if the second character may be appended to the first character according to the rules associated with the selected language. Additionally, the program module is operative to prohibit appending the second character to the first character if the second character may not be appended to the first character according to the rules associated with the selected language.

In another aspect of the present invention, a method is provided for establishing the sequence validation context of a sequence of characters. The method includes determining the maximum number of characters that may comprise a valid sequence of characters according to the rules of a selected language. Beginning with the last simple character of a sequence of characters, a determination is made as to whether the last character is valid as a complete sequence of characters comprising a complex character. If the last character of the sequence of characters is valid as a complete sequence of characters comprising a complex character, then the context of the input character is returned as a context for a complex character. If the input character of a sequence of characters is not valid as a complete sequence of characters comprising a complex character, then a determination is made as to whether a combination of the last character and the character input immediately to the left of the last character is valid as a complete sequence of characters comprising a complex character. If the combination of the last character and the character input immediately to the left of the last character is valid as a complete sequence of characters comprising a complex character, then a context for the combination is returned as the context for a complex character.

If the combination is not valid as a complete sequence of characters comprising the complex character, then a determination is made as to whether the combination combined with the next character to the left of the combination is valid as a complete sequence of characters comprising a complex character. If not, subsequent combinations of characters are created by adding one at a time additional characters input to the left of the last subsequent combination until the maximum number of characters that may comprise a valid sequence have been combined to form a sequence of characters that may be checked for validity as a complete sequence of characters comprising a complex character. If any of the subsequent combination of characters are valid as a complete sequence of characters comprising a complex character according to the rules of the selected language, then a context for that combination is returned as the context for a complex character.

Other objects, features, and advantages of the present invention will become apparent upon reading the following specification, when taken in conjunction with the drawings and the appended claims.

BRIEF DESCRIPTION OF THE DRAWINGS

FIGS. 4-1 and 4-2 are a state transition table illustrating allowable sequences of simple characters in the Thai language and includes allowable character replacement sequences.

FIGS. 4A-1 and 4A-2 are a state transition diagram illustrating allowable sequences of simple characters in the Thai language.

FIG. 5 is a state transition table illustrating allowable sequences of simple characters in the Hindi language and includes allowable character replacement sequences.

FIG. 9 is a table of character type and replace actions.

FIG. 9A is a table of character type and replace actions for the Thai language only.

FIG. 10 is a table illustrating a valid sequence of Hindi (Devanagari script) characters input on a user's keyboard and resulting complex character output.

FIG. 11 is a table illustrating an invalid sequence of Hindi (Devanagari script) characters input on a user's keyboard and resulting complex character output where the last input character is invalid and not displayed.

FIG. 12 is a table illustrating replacement of a previously validated character input by a subsequent character input to form a invalid sequence of Hindi (Devanagari script) characters input on a user's keyboard and resulting complex character output.

DETAILED DESCRIPTION OF THE DISCLOSED EMBODIMENTS

Figure 1:
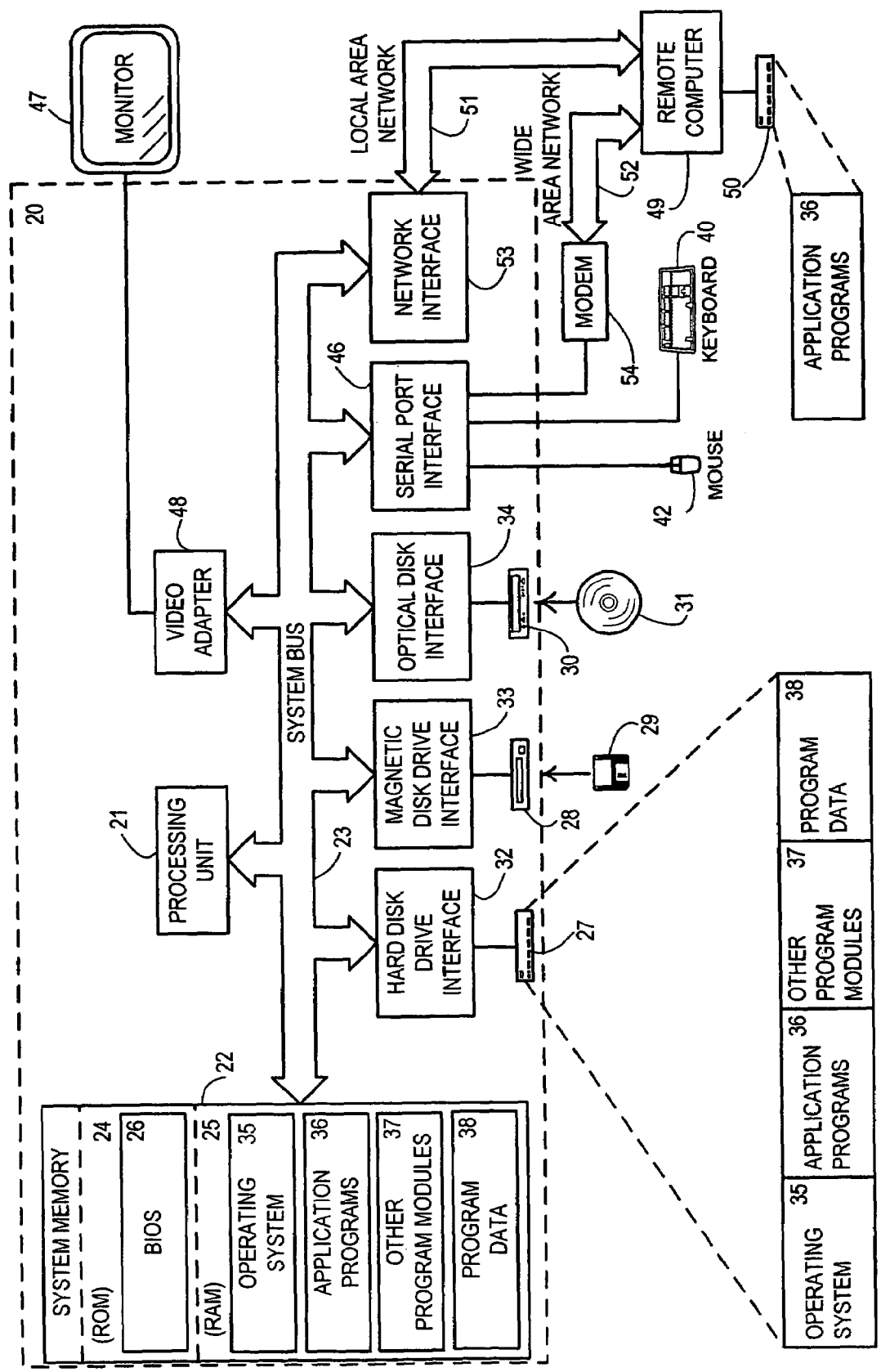
FIG. 1 is a block diagram of a personal computer that provides an exemplary operating environment for an embodiment of the present invention.

The present invention is directed to checking whether a simple character initially may be input or may be appended to a previously input simple character or sequence of simple characters to form a sequence of simple characters that is valid according to the syntactical rules of the language to which the characters belong. As should be understood, the functionality of the present invention may be utilized with a variety of computer software application programs with which text is entered, including word processors, database programs, graphics programs, etc.

As discussed above, many languages including, for example, South Asian languages like Thai, Vietnamese, and Hindi use combinations of various simple characters such as vowels, consonants, diacritics, tone marks, and accents to form complex characters. Those languages follow stringent syntactical rules that dictate which simple character is allowed next to or above or below another simple character in the composition of more complex characters and also words. For the sake of simplicity, for the remainder of this document, the syntactical rules for a given language which are followed to determine the validity of a single character or sequence of characters will be referred to as "rules." It should be understood that the rules utilized by the embodiments of the present invention may include any set of syntactical rules required by any language for representing sounds or words by single characters or sequences (including horizontal or vertical) of characters or symbols. Reference to specific languages and specific rules therefor is not intended to limit the scope of this document and the appended claims.

If a user edits characters that were previously input, the sequence validity context of a previously input sequence of simple characters may need to be rebuilt. Once the user places the cursor at a particular location, the functionality of the present invention looks backward a set number of characters to validate the past sequence of characters. Accordingly, the functionality then applies sequence checking to the next character input by the user based on the last character in the validated sequence. That is, by placing the cursor of the user's input program application (e.g., word processor) to the right of a previously input sequence of characters, the validity of that sequence is checked in order to allow the user to type another character which will be checked to determine whether it may be appended to the previous sequence in accordance with the rules of the selected language.

In another embodiment of the present invention, functionality is provided which attempts to replace or combine an existing simple character in a previously validated sequence with the new character being input by the user. This character type and replace functionality is referred to herein as character replacement for the sake of simplicity. For example, say the user has previously typed four correct simple characters in the process of typing a complex character comprised of six characters. Then, say the user types a fifth simple character which is incorrect. That is, the fifth character cannot combine with the previous four characters without violating the character sequence and syntactical rules of the selected language. The type and replace functionality of the present invention will try to replace and/or combine an existing simple character in the previously validated sequence (i.e., one of the previously four typed characters) to allow the user to successfully type the fifth character. That is, if the fifth character can not be used to combine with the existing sequence of characters to create a new complex character, the new character is discarded and is not displayed, and the existing complex character remains unaffected.

If the type and replace functionality succeeds, the new validated sequence of characters, including the last character typed by the user, are displayed on the user's computer screen. If the type and replace functionality does not succeed in replacing or combining a previous character with the newly typed character, the sequence is not changed, and the fifth character typed by the user is not displayed. The user must then attempt a different character as the fifth character. Accordingly, the type and replace functionality allows the user to automatically replace parts of an existing complex character or already validated sequence of simple characters without having to move the editing cursor within the complex character.

Exemplary Operating Environment

The processes and operations performed by the computer include the manipulation of signals by a processor or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, calling, comparing, receiving, sending, reading, transferring, determining, routing, selecting, transmitting, etc. which are often associated with manual operations performed by a human operator. The operations described herein are machine operations performed in conjunction with various input provided by a human operator or user that interacts with the computer.

Referring now to the drawings, in which like numerals represent like elements throughout the several figures, aspects of the present invention and the preferred operating environment will be described. FIG. 1 and the following discussion are intended to provide a brief, general description of the suitable computing environment in which the invention may be implemented. While the invention will be described in the general context of an application program that runs on an operating system in conjunction with a personal computer, those skilled in the art will recognize that the invention may also be implemented in combination with other program modules. Generally, program modules include routines, programs, components, data structures (such as tables or tree structures), etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communication network. In a distributed computing environment, program modules may be located in both local and remote memory storage devices.

Referring now to FIG. 1, an exemplary system for implementing the present invention includes a conventional personal computer 20, including a processor 21, a system memory 22, and a system bus 23 that couples the system memory 22 to the processor 21. The system memory 22 includes read only memory (ROM) 24 and random access memory (RAM) 25. A basic input/output system 26 (BIOS) is stored in ROM 24. The BIOS 26 essentially contains the basic routines that help to transfer information between elements within the personal computer 20 during certain computer operations, such as during start-up. The personal computer 20 further includes a hard disk drive 27, a magnetic disk drive 28 (e.g., that reads from and writes to a removable disk 29), and an optical disk drive 30 (e.g., that reads from an optical disk 31 or reads from or writes to other optical media). The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage for the personal computer 20. Although the description of computer-readable media above includes the hard disk drive 27, a removable magnetic disk 29 and a removable optical disk 31, such as a CD-ROM disk or DVD, it should be appreciated by those skilled in the art that other types of removable media which are readable by a computer, such as magnetic cassettes, flash memory cards, digital tapes, Bernoulli cartridges, and the like, may also be used in the exemplary operating environment.

A number of program modules may be stored in the drives and RAM 25, including an operating system 35, one or more program modules 36 (such as a word processing program module), other program modules 37. The operating system 35, in conjunction with the BIOS 26 and associated device drivers, provides the basic interface between the computer's hardware and software resources, the user, and program modules. A user may enter commands and information into the personal computer 20 through a keyboard 40 and an input or pointing device, such as a mouse 42.

Other input devices (not shown) may include a microphone, a key pad, a touch sensor, a joystick, a game pad, a satellite dish, a scanner, or the like. The keyboard 40, mouse 42, and other input devices are often connected to the processor 21 through a serial port interface 46, such as a game port or a universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote programmable devices, such as a remote computer 49. The remote computer 49 may be a server, a router, a peer device, or other common network node. Typically, the remote computer 49 includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the global Internet.

When used in a LAN networking environment, the personal computer 20 is connected to the local network 51 through a network interface 53. When used in a WAN networking environment, the personal computer 20 typically includes a modem 54 or other means for establishing communications over the wide area network 52, such as the global Internet. The modem 54, which may be internal or external, is connected to the system bus via the serial port interface 46. In a networked environment, program modules depicted relative to the personal computer 20, or portions thereof, may be stored in the remote memory storage device 50. It will be appreciated that the network connections shown are exemplary and other means of establishing a communications link between the personal computer 20 and the remote computer 49 may be used.

Implementation of Exemplary Embodiments of the Present Invention,

The present invention may be implemented as an independent character sequence checking and character replacement program or as a component or feature that is employed in conjunction with a separate computer program such as a word processing program capable of handling languages using complex characters. In an exemplary embodiment, the character sequence checking and character replacement program is embodied as a component in a dynamic-link library (DLL) that is used in conjunction with the "MICROSOFT WORD" word processing application program, which is published by the Microsoft Corporation of Redmond, Wash.

It should be understood that the character sequence checking and character replacement functionality of an exemplary embodiment of the present invention may be used in conjunction with any computer program application that allows for typing or inputting language text. For example, the character sequence checking and character replacement functionality also may be used in conjunction with "MICROSOFT EXCEL," MICROSOFT POWERPOINT," "MICROSOFT OUTLOOK,"MICROSOFT ACCESS," AND "MICROSOFT OFFICE" products, all published by the Microsoft Corporation of Redmond, Wash.

Figure 2:
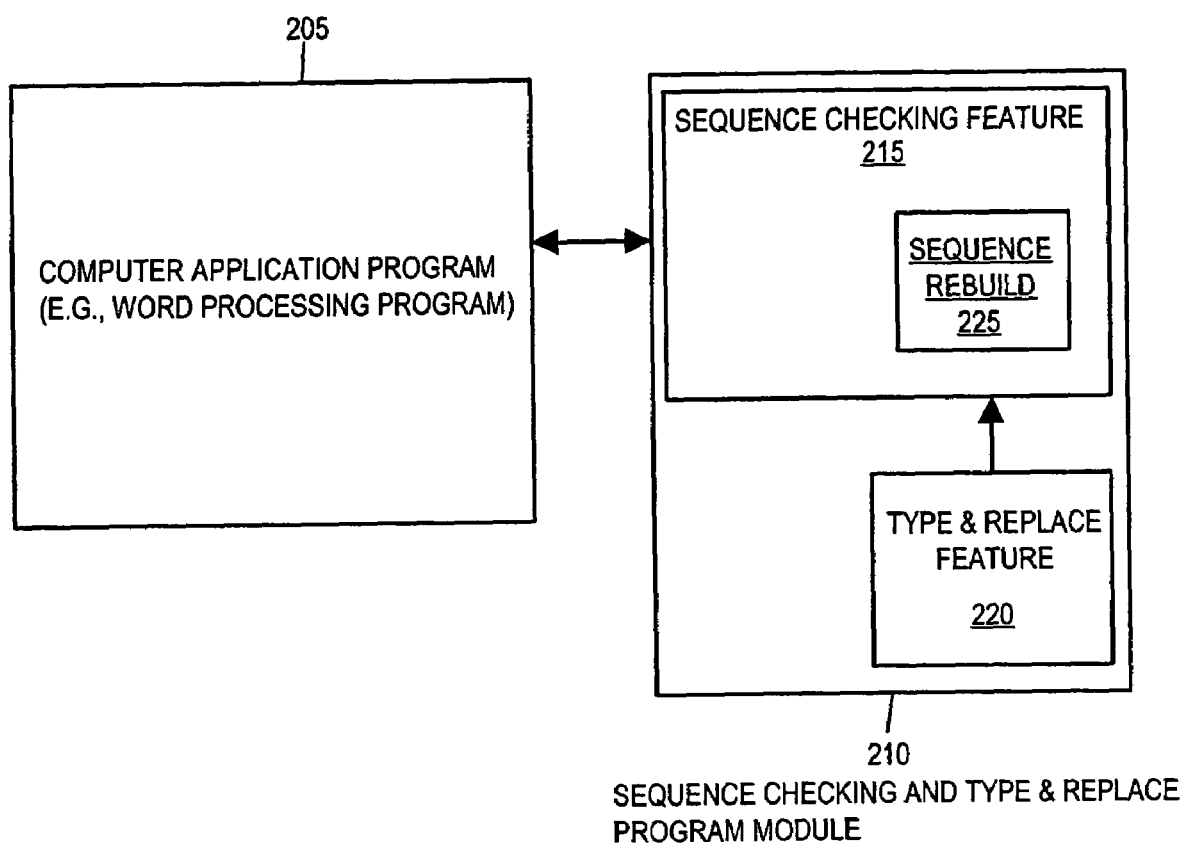
FIG. 2 is a block diagram illustrating the interaction between exemplary program modules of an embodiment of the present invention with an exemplary computer application program.

FIG. 2 is a block diagram illustrating the interaction between an exemplary program module of an embodiment of the present invention with an exemplary computer application program, such as a word processing application program. As illustrated in FIG. 2, the sequence checking and character replacement program module 210 may be called by the computer application program (e.g., word processing program) 205 for use of sequence checking and character replacement functionality. In an exemplary embodiment, the sequence checking and character replacement program module 210 may include a sequence checking feature 215 and a character type and replace feature 220. A sequence context reconstruction feature 225 is illustrated that may be utilized by the sequence checking feature 215 during text editing actions.

In an exemplary embodiment, it may be useful for any application program 205 that needs to use the functionality of the sequence checking and character replacement program module 210 to provide an operation system wide registry entry for the sequence checking and character replacement program module 210. This entry would point to the sequence checking and character replacement program module 210 for each language that requires sequence checking. Alternatively individual applications, such as application program 205 may register the sequence checking and character replacement program module 210 as a shared feature. Alternatively, the sequence checking and character replacement program module 210 may be embodied directly in the word processing application program 205.

Figure 3:
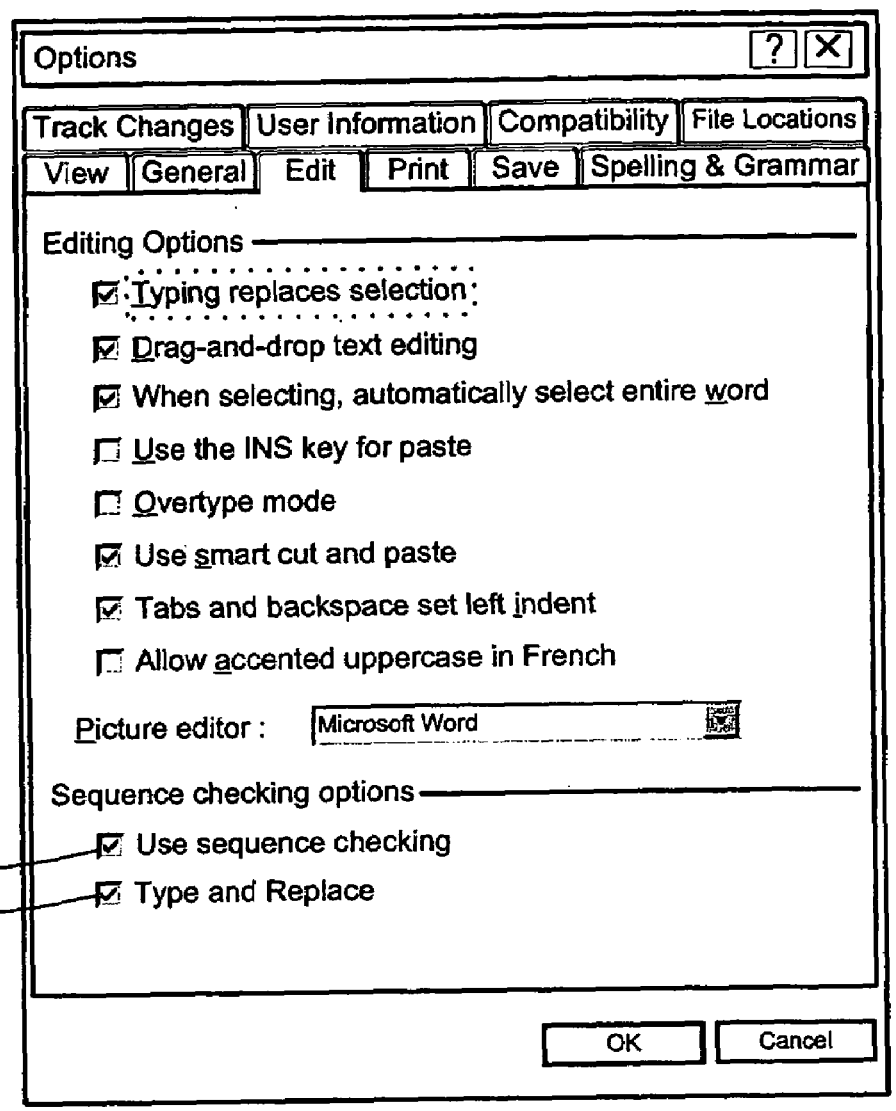
FIG. 3 depicts an illustrative computer program screen shot according to an exemplary embodiment of the present invention.

Before describing the particular implementation of the present invention, it is advantageous at this point to describe a set of exemplary user interfaces encountered by a user of a given computer application program employing an exemplary embodiment of the present invention. FIG. 3 depicts an illustrative computer program screen shot according to an exemplary embodiment of the present invention. As shown in FIG. 3., sequence checking options are exposed to the user for optional use. The sequence checking feature 215 and the character type and replace feature 220 are optional to the user and may be selected as desired by clicking on the box to the left of the options. If desired, these features could be set to operate by default rather than by option. Alternatively, these features may be exposed in the user's computer operating system registry only without a need for such option in this dialog. In this case, there should be a registry entry setting for each language that requires these features.

Referring still to FIG. 3, "Use Sequence checking" button 310 turns on/off the sequence checking feature 215. When this feature is turned off the user can type any character (tone, diacritic, vowel, and consonant, etc.) in any order and combination without intervention, unless some other type of grammar or spelling checking feature is separately employed. If the sequence checking feature 215 is turned off, other editing features like delete, backspace and cursor movements will behave just as they do in normal character input and editing operations such as with word processing using English text.

Selection of the "Type and Replace" button 320, turns on/off the character type and replace feature 220. In an exemplary embodiment, when the "Use Sequence Checking" 310 is turned off, the option "Type and Replace" 320 is not selectable and is grayed out. It only is selectable when "Use Sequence Checking" 310 is turned on.

In implementation of an exemplary embodiment of the present invention, the sequence checking feature 215 assists the user in entering a displayable sequence of characters according to the rules of the selected language by validating and memorizing each character entered by the user. If the character entered does not belong to any of the defined rules, it is not combined with the validated sequence of characters and it is not displayed. If the character is valid, then it is combined with the validated sequence and the new combination is displayed. FIG. 10 illustrates a valid sequence of simple Hindi characters input on the keyboard of a user's computer and the resulting output. The beginning of the sequence starts on the top line in the keyboard input column and ends with the character in the last line. In the example illustrated in FIG. 10, each new simple character input by the user correctly may be appended to the previous sequence of simple characters. FIG. 11 illustrates an invalid sequence of simple Hindi characters. As illustrated in FIG. 11, the last character input by the user may not be appended to the sequence of simple characters previously input, and so the last character is not displayed in the output.

It should be understood that the sequence checking feature 215 operates separately from a spelling checker program for the selected language. That is, the sequence checking feature 215 assists the user in the formation of complex characters from simple characters. The user may still misspell a word in the selected language by incorrectly stringing together complex characters which are individually valid in terms of the sequence of simple characters comprising each complex character. Similarly, the sequence checking feature 215 operates separately from a grammar checker program for the selected language. That is, the user may string together complex characters or words that are individually valid in terms of the sequence of simple characters comprising each complex character or word, but that violate the grammatical rules of the selected language.

For example, say the user is attempting to type the word "computer" in the Thai language, and for the sake of example only, say the Thai language requires a separate complex character that is the equivalent to each letter making up the English language spelling of the word "computer." According to this example, the user would type a series of simple characters to form a Thai complex character that is the equivalent of the letter "c." The user would then type a series of complex characters to form a Thai complex character that is the equivalent of the letter "o."

The functionality of the present invention will determine that the sequences of simple characters typed by the user to form the complex characters representing the "c" and the "o" are valid sequences. If the user had typed a sequence of simple characters to form the Thai equivalent of the letter "u" instead of the letter "o," (that is, the user is incorrectly spelling the word "computer" with a "u" instead of an "o") the functionality of the present invention would only insure the validity of the sequence of characters typed by the user for formation of the complex character representing the letter "u." Whether the word "computer" is spelled correctly will be determined by the user's spelling checker. Likewise, whether the word "computer" and a subsequent word typed by the user may be placed in sequence in accordance with the grammatical rules of the selected language will be determined by the user's grammar checker. The functionality of the present invention will only assist the user in correctly typing sequences of characters in the formation of individual complex characters and not words.

The sequence checking feature 215 of the present invention is implemented as a state transition machine, which is based on a table of transitions. Prior to typing text into a word processing document, for example, a specific language, such as Thai language, is selected by the user. This language will specify to the sequence checking feature 215 which table of transition to use. The state transition table implemented by the sequence checking feature 215 will provide the sequence checking feature 215 with allowable transitions from character to character based on the rules for the selected language.

Figures 1, 4A:
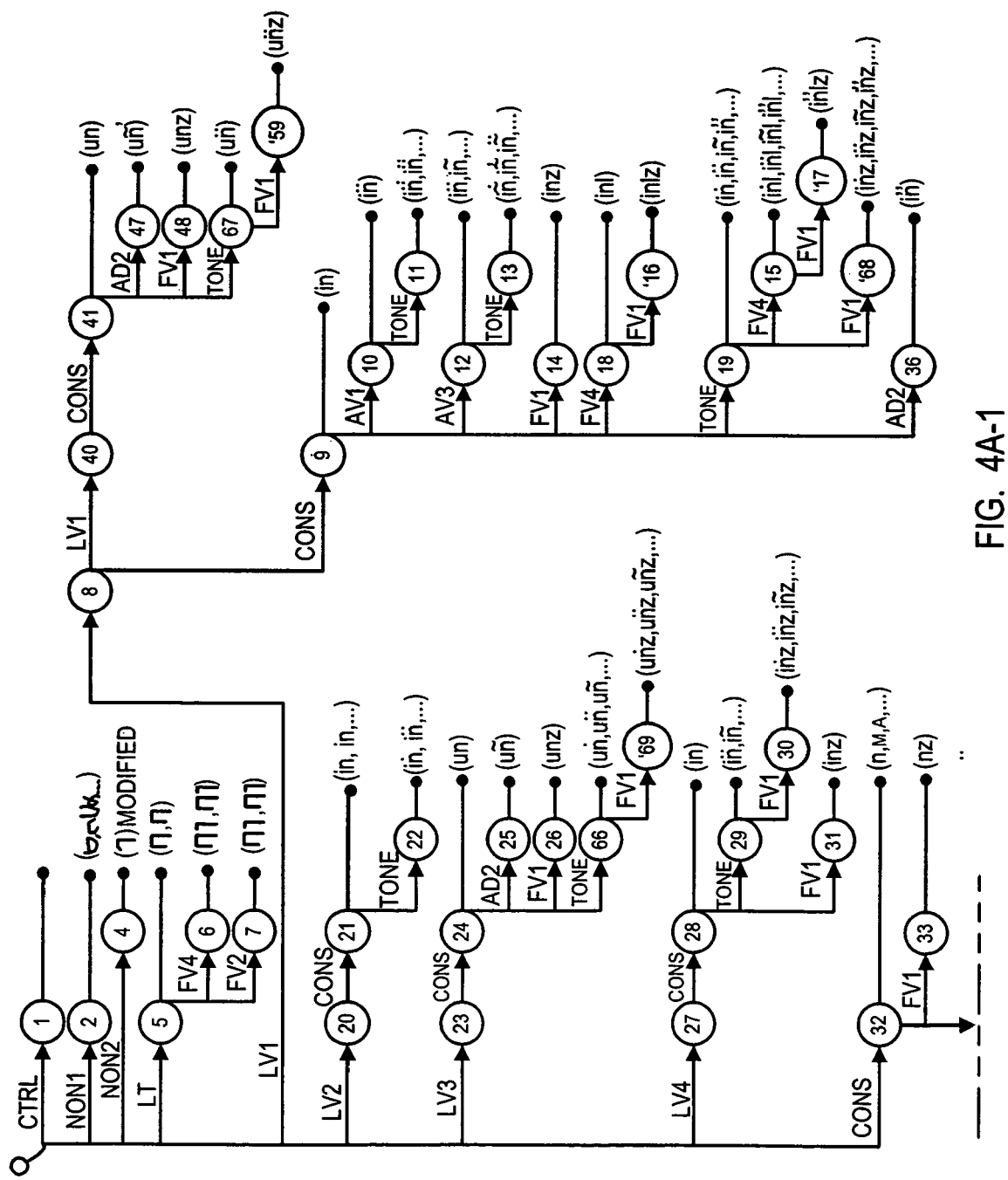
Figures 2, 4A:
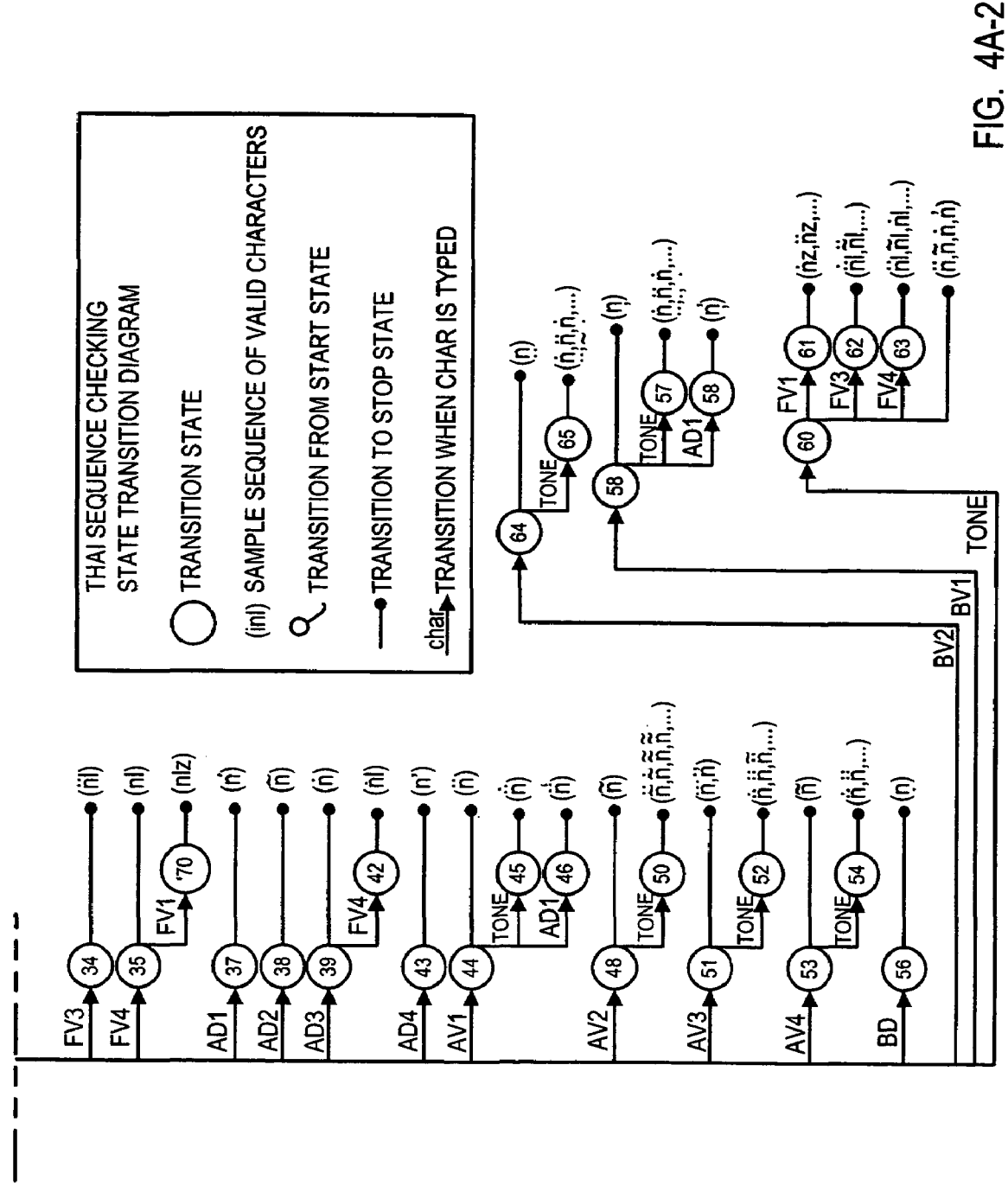
Figure 5A:
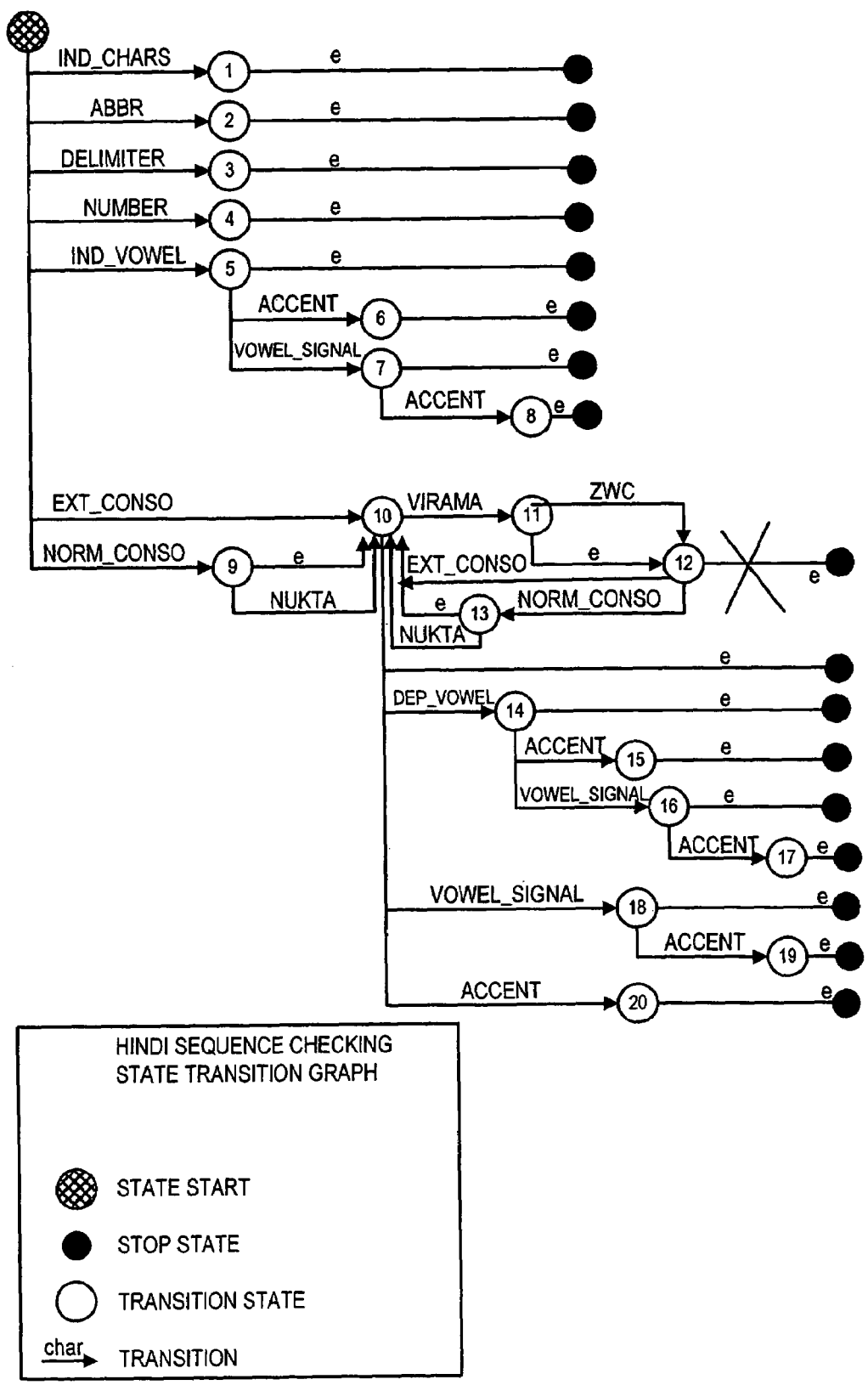
FIG. 5A is a state transition diagram illustrating allowable sequences of simple characters in the Hindi language.
Figures 6, 6A:
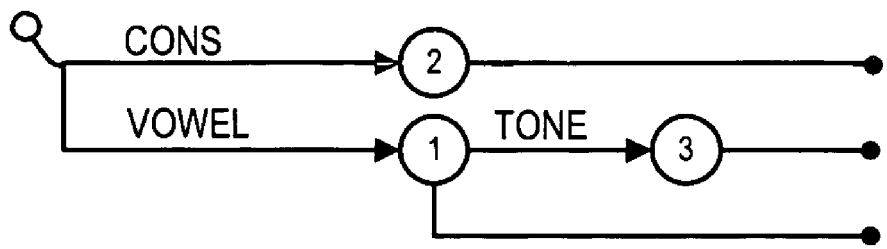
FIG. 6 is a state transition table illustrating allowable sequences of simple characters in the Vietnamese language and includes allowable character replacement sequences.
FIG. 6A is a state transition diagram and chart illustrating allowable sequences of simple characters in the Vietnamese language.

FIG. 4-1 is a state transition table illustrating allowable sequences of simple characters in the Thai language and includes allowable character replacement sequences. FIG. 4-2 is a continuation of the state transition table illustrated in FIG. 4-1. FIG. 4A-1 is a state transition diagram illustrating allowable sequences of simple characters in the Thai language. FIG. 4A-2 is a continuation of the state transition diagram illustrated in FIG. 4A-1. FIGS. 4A-1 and 4A-2 illustrate in flow diagram form the possible transitions illustrated in table form in FIGS. 4-1 and 4-2. FIG. 5 is a state transition table illustrating allowable sequences of simple characters in the Hindi language and includes allowable character replacement sequences. FIG. 5A is a state transition diagram illustrating allowable sequences of simple characters in the Hindi language. FIG. 5A illustrates in flow diagram form the possible transitions illustrated in table form in FIG. 5. FIG. 6 illustrates a state transition table illustrating allowable sequences of simple characters in the Vietnamese language and includes allowable character replacement sequences. FIG. 6A illustrates a state transition diagram illustrating allowable sequences of simple characters in the Vietnamese language. The state transition diagram of FIG. 6A illustrates in flow diagram form the possible transitions illustrated in table form in the state transition table illustrated in FIG. 6.

The tables and diagrams illustrated in FIGS. 4–6A are based on the syntactical rules of the selected languages and are presented for illustrative purposes only. The syntactical rules for each represented language, including placement of simple characters relative to each other in formation of complex characters is well known to those skilled in the mechanics of those languages. Also, it should be well understood that the present invention is not limited to the illustrative languages used in this description, but is applicable to the formation of any rules-dictated sequence of characters of any language.

Referring to FIGS. 4-1 and 4-2, the user types a specific character, such as a leading vowel (LV1–LV4) in the Thai language, the sequence checking feature 215 of the present invention starts from an initial state of zero, and identifies the class or category of that character (in this case, a leading vowel). That class specifies the column in the state transition table or the starting point in the state transition flow diagram to look into. The sequence checking feature 215 then finds the transition state number and the predefined series of state transition actions to apply to the existing sequence of characters (in this case, a sequence of one character—the leading vowel).

The transition state numbers indicate the next state to start from before treating the next input character. If the next state is zero, then the sequence checking feature 215 has reached a valid and complete sequence. If the next input character does not transition to any other state number then the character is not valid and is not combined with or appended to the existing sequence. Once a determination is made that the typed character is not valid, the sequence checking feature 215 prevents the input of the typed simple character, and the user is forced to type an alternate simple character.

For example, referring still to FIGS. 4-1 and 4-2, starting with the input of a leading vowel (LV1), the state transition table allows two possible transition states, namely states 40 and 9. That is, after the user types in a next character after the leading vowel, the next character is located in the row at the top of the table. Then, the column under the newly-typed character is followed to find possible transition states. Cells that are shaded gray contain transitions for use by the character type and replace feature 220 and are discussed below. If the type and replace feature 220 is turned off, the cells shaded in gray are not used. A blank cell in the state transition table indicates that the newly input character may not be used according to the rules of the selected language. The additional information contained in each field also is described below.

Referring now down the "state" column, it is seen that state 40 represents a character sequence context of LV1LV1 which means that if the user types another leading vowel after the initial leading vowel (i.e., a trailing vowel since it will follow the first leading vowel), the second vowel will be allowable under the rules for the Thai language. State 9 shows that the addition of a consonant (C) is an allowable next character.

However, if for example, the user types a tone mark (T) after typing the first leading vowel, that simple character will not be displayed because a leading vowel followed by a tone mark is not allowed and is not one of the transition states pointed to in the state transition table after the input of the leading vowel. Referring to FIGS. 4A-1 and 4A-2 and keeping with the present example, starting with any leading vowel (LV1–LV4) it is seen that the only allowable flow is to another vowel or a consonant.

It should be understood that for some languages, only a certain set of simple characters may be typed first. That is, if other than an allowable first character is typed, the character will not be displayed. Referring to FIGS. 4-1 through 4A-2, for the Thai language, it is seen that the only characters that may be typed first include non-composible (NON) Thai characters, such as English language punctuation marks, control keys (CTRL), spaces, long tail consonants (LT), leading vowels (LV) and consonants (C). The tables and flow diagrams illustrated in FIGS. 5, 5A, 6 and 6A are used and operate in a manner like that described for the table and flow diagram illustrated in FIGS. 4-1 through 4A-2.

The sequence checking feature 215 does not handle replacement or deletion of existing simple characters during the input of a sequence of simple characters. As described above, that feature prohibits the addition of an invalid simple character onto an otherwise valid sequence of simple characters. In accordance with an exemplary embodiment of the present invention, the character type and replace feature 220 complements the sequence checking feature 215.

The character type and replace feature 220 allows for the automatic replacement of parts of the sequence of simple characters being validated by the sequence checking feature 215 without having to move the cursor back to a position at which the edit needs to take place. FIG. 12 illustrates input of simple Hindi characters acted upon by the functionality of the character type and replace feature 220. As illustrated in FIG. 12, the last simple character input by the user may not be appended to the sequence of previously input characters without violating the rules of the Hindi language. Therefore, the character type and replace feature 220 removes the first character of the sequence and inserts the new character (last character input) and inserts the new character before the last character of the sequence. Operation of type and replace actions used by the character type and replace feature 220 is described in detail below.

The character type and replace feature 220 is optional and is triggered when the sequence checking feature 215 invalidates an input character. As described above, the character type and replace feature 220 must be turned on by the user if it is not set on by default. Because the character type and replace feature 220 is complementary to the sequence checking feature 215, the sequence checking feature 215 must be on in order to use the character type and replace feature 220.

When the sequence checking feature 215 invalidates an input character, the character type and replace feature 220 tries to replace and/or combine an existing simple character in the validated sequence with the newly input simple character according to the rules for the selected language. If the character type and replace feature 220 succeeds, the new complex character is displayed. If not, the complex character is not changed.

The character type and replace feature 220 is implemented as a state transition machine similar to the implementation of the sequence checking feature 215 described above. As with the sequence checking feature 215, implementation of the character type and replace feature 220 is based on a table of transitions. At typing time, a specific language, such as Thai language, is selected by the user. This language will specify to the character type and replace feature 220 which table of transition to use. The state transition table implemented by the character type and replace feature 220 provides the character type and replace feature 220 with character replacement actions based on the rules for the selected language.

Referring to FIGS. 4, 5 and 6, the cells in the transition tables shaded in gray represent character type and replace actions which may be taken by the type and replace feature 220 to insert a newly typed character into a previously validated sequence or to replace a previously accepted simple character with the newly typed simple character. For example, referring to FIG. 5, say the user has selected the Hindi language for text input and has initially typed an independent vowel (Iv) followed by an accent (Ac). Next the user types a vowel sign (Vs). First, the state of the current sequence context (IvAc) is determined by looking down the "context" column to find state 6 corresponding to context (IvAc). Next, the row containing state 6 is followed to the right to the cell under the newly typed character (Vs) located in the "character" row at the top of the table. That cell which is shaded in gray indicates the new character may not be appended to the current sequence and the cell contains the type and replace action "8i1" for use by the type and replace feature 220 in dealing with the newly typed character.

FIG. 9 is a table of character type and replace actions. FIG. 9A is a table of character type and replace actions for the Thai language only. Referring to FIG. 9, the action "8i1" is translated according to the symbol "Char i[n]," where i=1, to direct that the new character (Vs) should be inserted into the current sequence one "1" character from the right or just to the left of the accent (Ac). The "8" in the action indicates the state of the sequence to transition to after the type and replace action is accomplished. Referring back to FIG. 5, and looking down the "state" column to state "8," it is seen that the corresponding sequence context is (IvVsAc). It can be seen for the example sequence of (IvVsAc) that the next state for this sequence, found in the column to the right of the "state column," is zero (0). Accordingly, the sequence is a complete and valid sequence. Therefore, if a new character is typed by the user that new character will begin a new sequence. The character type and replace functionality works only on a valid sequence of characters. That is, the character type and replace functionality modifies a valid sequence of characters with an invalid character to generate another valid sequence of characters.

Accordingly, while the rules of the Hindi language did not allow the vowel sign (Vs) to be appended to the sequence of the independent vowel and the accent, the replace action taken by the type and replace feature 220, inserted the vowel sign into the sequence in a manner consistent with the rules of the selected language (in this case Hindi). Referring back to FIG. 9, it can be seen that other actions include, for example, "a" for append the new character, "d1" for remove the previous character, "dn" for remove the nth character, "r1" for replace the previous character with the new character, and "m" for replace the nth character with the new character.

Figure 7:
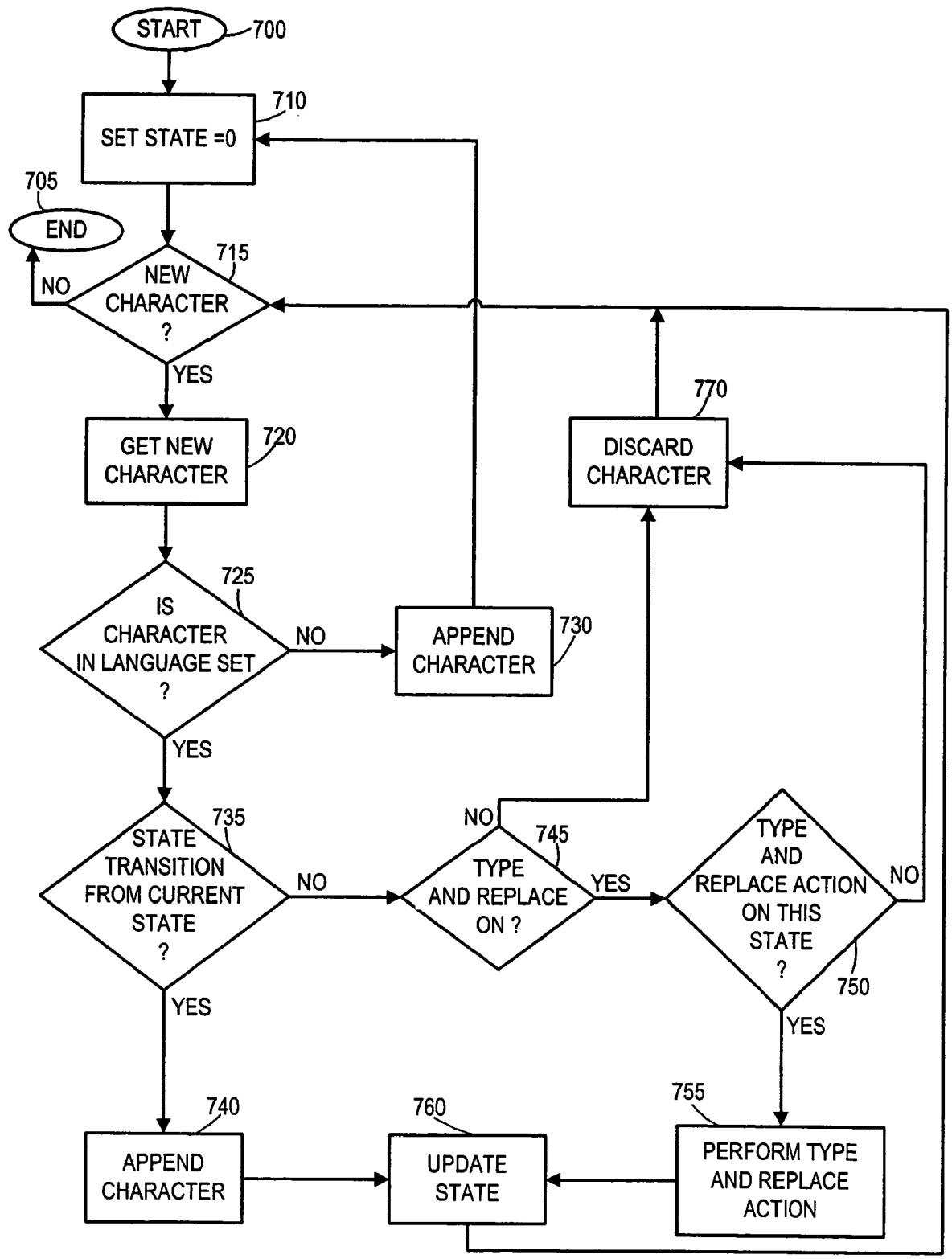
FIG. 7 is a flow diagram illustrating the preferred steps for character sequence checking and type and replace for a newly input character.

It is advantageous to describe the operation of the exemplary features of the present invention by way of an exemplary flow diagram. FIG. 7 is a flow diagram illustrating the preferred steps for character sequence checking and type and replace for a newly input character. At step 700, the method begins and moves to step 710 where the transition state for sequence checking is set to an initial state of zero. At step 715 a determination is made whether a new character has been input. If not the method ends at step 705. If a new character has been input, the method proceeds to step 720 and gets the new character for sequence checking in accordance with the rules of the selected language.

At step 725, a determination is made whether the new character is a member of the set of characters comprising the selected language. If the new character is not a character of the selected language, the method proceeds to step 730 and the new character is appended to the sequence. The method then proceeds to step 710 where the transition state is reset to zero so that the next input character will begin a new sequence. As discussed above, when a non-selected language character is input such as an English language punctuation mark or space, that character is allowed, but the selected language character will start a new sequence.

If at step 725 the newly input character does belong to the set of characters comprising the selected language, the method proceeds to step 735. At step 735, a determination is made whether there is a state transition from the current state for the newly input character. As discussed above, there will be a state transition from the current state if the cell in the state transition table (FIGS. 4, 5, 6) corresponding to the new character contains an action to append the new character. No transition from the current state exists if the cell is blank or if the cell contains only type and replace actions.

If at step 735 there is a state transition from the current state, that is, the new character may be appended to the last character or the new character may be initially input to start a sequence, then the method follows the "yes" branch and proceeds to step 740. At step 740, the new character is accepted as the initial character or is appended to the last character. For example, referring to FIG. 5, if the new character input is an independent vowel (Iv) in the Hindi language, then the transition state in the cell corresponding to the new character includes the action "5a" which indicates the character may be appended and the new state of the sequence is state 5. State 5 is accordingly the starting state for the next input character.

The method then proceeds to step 760 where the state is updated. For the present example, the state is updated to state 5. The method then proceeds to step 715 to determine whether there is a new character. If there is no new character, the method ends at step 705.

If at step 735, there is no state transition from the current state, as in the case of an invalid character, the method follows the "no" branch to step 745. At step 745, a determination is made whether the functionality of the character type and replace feature 220 is turned on. If the character type and replace feature 220 is not turned on, the method follows the "no" branch and proceeds to step 770 where the newly typed character is discarded and is prohibited from display. Continuing with the example set forth above, say the next character typed after the independent vowel (Iv) is a dependent vowel (Dv) in the Hindi language. Referring to FIG. 5, following down the column under the Dv character to state 5 (previously set) yields a blank cell which indicates no transition from the last state. Accordingly, the new character may not be appended to the sequence comprised of the independent vowel (Iv) and so the user must input a new character at step 715. If the user does not input a new character then the method ends at step 705.

If at step 745 the character type and replace feature 220 is turned on, the method follows the "yes" branch and proceeds to step 750. At step 750 a determination is made as to whether there is a type and replace action on this state. In the present example, the user typed in a dependent vowel after an independent vowel in the Hindi language. As discussed above, referring to the state transition table in FIG. 5, the input of the dependent vowel (Dv) after the independent vowel (Iv) yielded a blank cell which indicates there is no transition state from the previous state. That blank cell also indicates that there are no available type and replace actions for this character. In other words, the previously validated character (Iv) cannot be replaced with the new character (Dv) to yield a valid sequence of one character beginning with the dependent vowel because dependent vowels may not come first in a valid Hindi character sequence.

Say, for example, that the current sequence at step 750 is an independent vowel followed by an accent (IvAc) in the Hindi language and the new character typed by the user is a vowel sign (Vs). This example was fully discussed above. At step 750, a determination is made from the state transition table in FIG. 5 that the type and replace action for this character is "8i1." The method proceeds to step 755 where the type and replace action is performed. As discussed above, the action "8i1" directs the newly typed character to be inserted into the sequence before the first character on the right. In the present example, the vowel sign (Vs) is inserted before the accent (Ac) to yield the sequence of an independent vowel followed by a vowel sign followed by an accent (IvVsAc).

The method then proceeds to step 760 and updates the transition state. In the present example, the transition state is updated to state 8 which is the state of the three-character sequence (IvVsAc). The method then proceeds to step 715 to determine whether there is a new character. If there is no new character, the method ends at step 705. Referring to FIG. 5, it can be seen for the example sequence of (IvVsAc) that the next state for this sequence (found in the column to the right of the "state column," is zero (0). Accordingly, the sequence is a complete and valid sequence. Therefore, if a new character is typed by the user at step 720, that new character will begin a new sequence.

The sequence checking feature 215 is applied during the sequential keyboard entry of characters. If the user moves the cursor which changes the sequence being validated, the sequence checking feature 215 reconstructs the sequence context before restarting the validation with newly entered characters. While typing a complex character sequence, the user may leave the sequence by using Backspace, Delete, typing a non-selected language character, or by moving the cursor somewhere else in the text to begin typing complex characters again. In this case, the sequence context reconstruction feature 225 will reconstruct the context of the complex character in order to resynchronize the sequence checking feature 215 with the right state in the state transition table. If the user opens a document which was typed without the sequence checking feature 215, the sequence context reconstruction feature 225 may have to undo what the user typed in order to reconstruct the sequence context of a given sequence.

Figure 8:
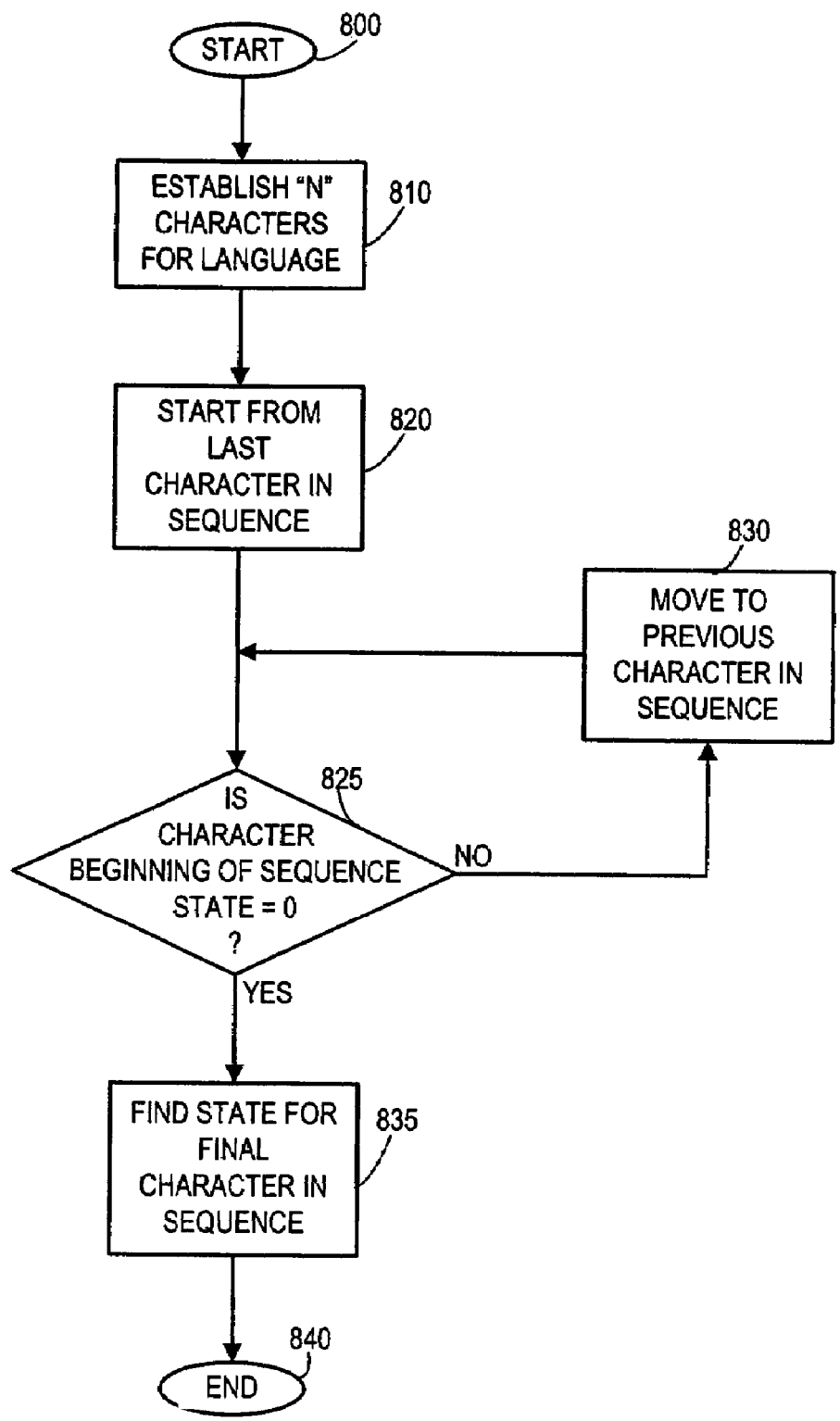
FIG. 8 is a flow diagram illustrating the preferred steps for reconstructing the context of a previously input sequence of characters.

FIG. 8 is a flow diagram illustrating the preferred steps for reconstructing the context (i.e., sequence of characters) of a previously input sequence of characters. In general the context or character sequence of a previously input sequence of characters is determined by placing the cursor of the user's computer program at some location to the right of a sequence of simple characters or complex character and identifying the first complete complex character to the left of the cursor. This is accomplished by identifying the simple character that starts the complex character from the very last simple character of the sequence (which is the character at the left of the cursor). The identification process goes from right to left starting with the character at the left of the cursor and ending on the first character of the identified complex character or ending on an invalid character after a specified number of character scans according to the selected language.

The method begins at step 800 and moves to step 810. At step 810 the maximum number "n" of characters which may comprise a complex character in the selected language is established. For example, say the selected language is Hindi, and in Hindi the maximum number of simple characters which may comprise a Hindi complex character is five (5). The method then moves to step 820 where the cursor is placed at some location in the text typed in the selected language.

In the present example, say the cursor is placed to the right of a complex character typed in Hindi and comprised of an independent vowel followed by a vowel sign followed by an accent (IvVsAc). The method then proceeds to step 825 where a determination is made whether the last character (Ac) is the beginning of a sequence which would yield a next state of zero (0). That is, if the next state after entry of the character (Ac) is zero, then that character is a complete sequence and the sequence context has been reconstructed which means the sequence checking feature 215 may begin checking the next sequence input by the user.

Because the last character did not yield a next state of zero, the method follows the "no" branch and proceeds to step 830 where the method moves to the next character and then proceeds back to step 825. At step 825, a determination is made whether the last two characters complete a sequence which yields a next state of zero. In the present case the last two characters (VsAc) do not yield a next state of zero.

Accordingly, the method follows the "no" branch to step 830 and moves back to the third character from the right before proceeding back to step 825.

At step 825, a determination is made as to whether the sequence of the three characters (IvVsAc) complete a sequence which yields a next state of zero. With reference to FIG. 5, it can be seen that this sequence does yield a next state of zero which means the sequence is a valid and complete sequence in accordance with the rules of the selected language. The method then proceeds to step 835 and finds the final state of the three-character sequence or state 8 for the present example. This state is used by the sequence checking feature 215 to determine where to start from in checking the next sequence of characters.

If the method goes back at step 830 until it reaches the maximum number of characters that may comprise a complex character under the selected language without finding a complete and valid sequence, then that sequence of characters includes one or more invalid characters. This would be the case where the sequence was input with the sequence checking feature turned off. In this case the user can simply delete the sequence and re-type the sequence.

As described herein, the present invention provides for a method and system for checking the validity of a sequence of input characters according to the syntactical rules of a selected language. If an input character may not be appended to the previously input sequence according to the rules of the selected language, the newly input character may be prohibited from being appended to the sequence and displayed on the user's computer. The present invention provides for editing of previously input character sequences by determining the validity context of sequences of characters previously input.

While this invention has been described in detail with particular reference to exemplary embodiments thereof, it will be understood that variations and modifications can be effected within the spirit and scope of the invention as described herein and as defined in the appended claims.

What is claimed is:

1. A computer-readable medium on which is stored a computer program for checking sequences of characters against rules, wherein the rules define a plurality of valid input sequences of characters for use in creating complex characters, the computer program comprising instructions, which when executed by a computer, perform acts of:

receiving a first character;

receiving a second character;

determining that a sequential order of reception of the first character relative to reception of the second character is consistent with at least one of the valid input sequences of characters comprising;

assigning a first state to the first character according to the rules, assigning a second state to the second character according to the rules, and determining that a state transition table includes a state transition from the first state to the second state, the state transition from the first state to the second state indicating that the sequential order of reception of the first character relative to reception of the second character is consistent with the at least one of the valid input sequences of characters wherein determining that the state transition table includes the state transition from the first state to the second state comprises determining that the state transition table includes a cell corresponding to a cross-reference of the first character and the second character, the cell not being blank and not including only type and replacement actions; and displaying on a display screen a complex character formed by combining at least the first character with the second character prior to receiving additional characters when the sequential order of reception of the first character relative to reception of the second character is consistent with the at least one of the valid input sequences of characters wherein combining at least the first character with the second character comprises combining at least the first character with the second character according to a rule contained in the cell.

2. A computer-readable medium as defined in claim 1, wherein the computer program further comprises instructions, which when executed by a computer, perform acts of:

in response to receiving the second character, prohibiting display of the second character on the display screen if the sequential order of reception of the first character relative to reception of the second character is not consistent with at least one of the valid input sequences of characters.

3. A computer-readable medium as defined in claim 1, wherein the computer program further comprises instructions, which when executed by a computer, perform acts of:

receiving at least one character prior to receiving the first and second characters, wherein a sequential order of reception of the previously-received character relative to reception of the first character is consistent with at least one of the valid input sequences of characters, and wherein the complex character displayed by the displaying act is formed by combining at least the first character and the second character with the previously-received character.

4. A computer-readable medium as defined in claim 1, wherein the computer program further comprises instructions, which when executed by a computer, perform acts of:

receiving a third character; and displaying the third character in sequence with the complex character.

5. A computer-readable medium as defined in claim 1, wherein the displaying act is not performed if the sequential order of reception of the first character relative to reception of the second character is not consistent with any of the valid input sequences of characters.

6. The computer-readable medium of claim 1, wherein the rules comprise one or more rules for creating complex characters according to a selected language.

7. A computer-readable medium as defined in claim 1, wherein the computer program further comprises instructions, which when executed by a computer, perform acts of:

providing a user interface element operable for selection by a user to enable checking the sequences of characters against the rules; and performing the displaying act if the user interface element is selected.

8. A computer-readable medium on which is stored a computer program for checking sequences of characters against rules, wherein the rules define a plurality of valid input sequences of characters for use in creating complex characters, the computer program comprising instructions, which when executed by a computer, perform acts of:

receiving a first character;

receiving a second character;

determining that a sequential order of reception of the first character relative to reception of the second character is consistent with at least one of the valid input sequences of characters comprising;

assigning a first state to the first character according to the rules, assigning a second state to the second character according to the rules, and determining that a state transition table includes a state transition from the first state to the second state, the state transition from the first state to the second state indicating that the sequential order of reception of the first character relative to reception of the second character is consistent with the at least one of the valid input sequences of characters wherein determining that the state transition table includes the state transition from the first state to the second state comprises determining that the state transition table includes a cell corresponding to a cross-reference of the first character and the second character, the cell not being blank and not including only type and replacement actions;

constructing a complex character in response to reception of the first character and the second character when the sequential order of reception of the first character relative to reception of the second character is consistent with the at least one of the valid input sequences of characters wherein constructing the complex character in response to reception of the first character and the second character comprises constructing the complex character in response to reception of the first character and the second character according to a rule contained in the cell; and displaying on a display screen the complex character in a first display state as constructed in response to reception of the second character and prior to receiving additional characters.

9. A computer-readable medium as defined in claim 8, wherein the constructing and displaying acts are not performed if the sequential order of reception of the first character relative to reception of the second character is not consistent with any of the valid input sequences of characters.

10. A computer-readable medium as defined in claim 8, wherein the first display state represents a complete complex character, the computer program further comprising instructions, which when executed by a computer, perform acts of:
receiving a third character; and
displaying the third character in sequence with the complex character in the first display state.

11. A computer-readable medium as defined in claim 10, wherein the act of displaying the third character in sequence with the complex character in the first display state is prohibited if the third character does not begin one of the valid input sequences of characters.

12. A computer-readable medium as defined in claim 8, wherein the first display state does not represent a complete complex character, the computer program further comprising instructions, which when executed by a computer, perform acts of:
receiving a third character; and
wherein the constructing act further constructs the complex character in response to reception of the third character if a sequential order of reception of the second character relative to reception of the third character is consistent with at least one of the valid input sequences of characters, the displaying act displaying the complex character in a second display state as constructed in response to reception of the third character and prior to receiving additional characters.

13. A computer-readable medium as defined in claim 12, wherein the second display state represents a complete complex character.

14. A computer-readable medium as defined in claim 12, wherein the computer program further comprises instructions, which when executed by a computer, perform acts of:
prohibiting further construction of the complex character if the sequential order of reception of the third character relative to reception of the second character does not begin one of the valid input sequences of characters, wherein the displaying act maintains display of the complex character in the first display state.

15. A computer-readable medium as defined in claim 12, wherein the computer program further comprises instructions, which when executed by a computer, perform acts of:
receiving a fourth character; and
if the second display state does not represent a complete complex character of the selected language, the constructing act further constructing the complex character in response to reception of the fourth character if a sequential order of reception of the third character relative to reception of the fourth character is consistent with at least one of the valid input sequences of characters, wherein the displaying act displays the complex character in a third display state as constructed in response to reception of the fourth character and prior to receiving additional characters.

16. A computer-readable medium as defined in claim 15, wherein the third display state represents a complete complex character of the selected language.

17. A computer-readable medium as defined in claim 8, wherein the rules comprise one or more rules for creating complex characters according to a selected language.

18. A computer-readable medium as defined in claim 8, wherein the computer program further comprises instructions, which when executed by a computer, perform acts of:
providing a user interface element operable for selection by a user to enable checking the sequences of characters against the rules; and
performing the constructing and displaying acts if the user interface element is selected.

19. A method for checking sequences of characters against rules, wherein the rules define a plurality of valid input sequences of characters for use in creating complex characters, the method comprising:
receiving a first character;
receiving a second character;
determining that a sequential order of reception of the first character relative to reception of the second character is consistent with at least one of the valid input sequences of characters comprising;

assigning a first state to the first character according to the rules, assigning a second state to the second character according to the rules, and determining that a state transition table includes a state transition from the first state to the second state, the state transition from the first state to the second state indicating that the sequential order of reception of the first character relative to reception of the second character is consistent with the at least one of the valid input sequences of characters wherein determining that the state transition table includes the state transition from the first state to the second state comprises determining that the state transition table includes a cell corresponding to a cross-reference of the first character and the second character, the cell not being blank and not including only type and replacement actions; and displaying on a display screen a complex character formed by combining at least the first character with the second character prior to receiving additional characters when the sequential order of reception of the first character relative to reception of the second character is consistent with the at least one of the valid input sequences of characters wherein combining at least the first character with the second character comprises combining at least the first character with the second character according to a rule contained in the cell.

20. A method as defined in claim 19, further comprising:

receiving at least one character prior to receiving the first and second characters, wherein a sequential order of reception of the previously-received character relative to reception of the first character is consistent with at least one of the valid input sequences of characters, and wherein the complex character displayed by the displaying act is formed by combining at least the first character and the second character with the previously-received character.

* * * * *